(12) United States Patent
Chen

(10) Patent No.: US 6,760,569 B1
(45) Date of Patent: Jul. 6, 2004

(54) FOLDABLE PERIPHERAL EQUIPMENT FOR TELECOMMUNICATION ATTACHED TO A STEERING WHEEL OF VEHICLES

(75) Inventor: Tonny Chen, Chang-Hua (TW)

(73) Assignee: E-Lead Electronics Co., Ltd., Chang-Hua (TW)

( * ) Notice: Subject to any disclaimer, the term of this patent is extended or adjusted under 35 U.S.C. 154(b) by 0 days.

(21) Appl. No.: 09/487,284

(22) Filed: Jan. 19, 2000

(51) Int. Cl.[7] .............................. H04B 1/38; H04M 1/00
(52) U.S. Cl. ........................... 455/90; 455/99; 455/575; 379/454
(58) Field of Search .......................... 455/66, 550, 575, 455/569, 90, 99, 100; 379/446, 454, 455; 224/276, 497; D12/174, 175, 177; D08/382

(56) References Cited

U.S. PATENT DOCUMENTS

| | | | | |
|---|---|---|---|---|
| 4,698,838 A | * | 10/1987 | Ishikawa et al. | 224/276 |
| 4,917,130 A | * | 4/1990 | Sweder | 224/276 |
| 5,177,665 A | * | 1/1993 | Frank et al. | 224/929 |
| 5,386,785 A | * | 2/1995 | Naor | 108/44 |
| 5,487,521 A | * | 1/1996 | Callahan | 224/276 |
| 5,542,314 A | * | 8/1996 | Sullivan et al. | 224/276 |
| 5,659,887 A | * | 8/1997 | Ooe | 455/575 |
| 5,749,306 A | * | 5/1998 | Breuner | 108/44 |
| D431,019 S | * | 9/2000 | Richter | D12/426.1 |
| 6,209,767 B1 | * | 4/2001 | Liou | 224/276 |
| 6,305,217 B1 | * | 10/2001 | Mansfeld et al. | 224/276 |
| 6,457,421 B1 | * | 10/2002 | Apichom | 108/44 |

FOREIGN PATENT DOCUMENTS

WO    WO 94/05105 A   *   3/1994

* cited by examiner

Primary Examiner—Charles Appiah
(74) Attorney, Agent, or Firm—Rosenberg, Klein & Lee

(57) ABSTRACT

A peripheral equipment for telecommunication is foldable and attachable to a steering wheel of vehicles. More particularly, it is easily mounted onto a steering wheel and extendable for use and foldable for storage. Thus, it will not interfere with the normal operation of a steering wheel and block a driver's visual sight of the gauges on a dashboard of a vehicle. Besides, it permits a driver to extend and fold at random a peripheral equipment for telecommunication, such as automatic fee collecting systems at fee collecting stations, dialing operators of cellular phones, incoming phone indicators and etc. during driving without moving his or her hands off a steering wheel or shifting the driver's view from a moving course. Thereby, drivers can process telecommunication information and drive vehicles safely at the same time. Such a peripheral equipment is made up of an information box and a mount which permit a driver to extend and fold with readiness.

6 Claims, 11 Drawing Sheets

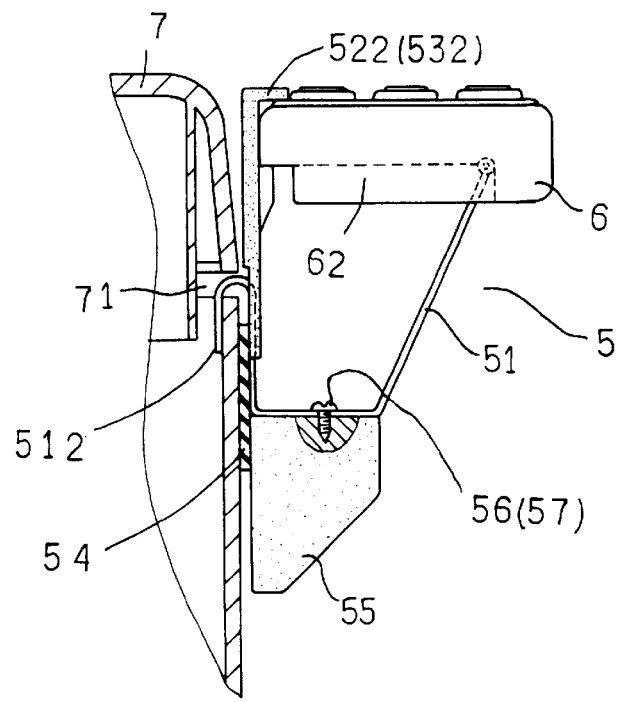
F I G. 11
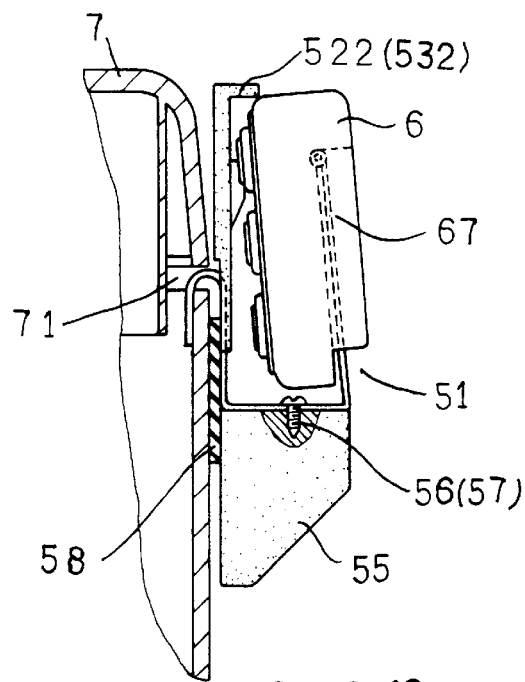
F I G. 12

FOLDABLE PERIPHERAL EQUIPMENT FOR TELECOMMUNICATION ATTACHED TO A STEERING WHEEL OF VEHICLES

BACKGROUND OF THE INVENTION

The present invention relates to a peripheral equipment for telecommunication use which is foldable and attachable to a steering wheel of vehicles with ease and safety. More particularly, it can be mounted to a steering wheel and extended in use and folded for storage with speed. It is operated without interfering with the normal operation of a steering wheel and blocking a driver's visual sight of the gauges on a dashboard of a vehicle. Besides, it permits a driver to extend and fold telecommunication systems, such as automatic fee collecting systems at fee collecting stations, dialing operators of cellular phones, incoming phone indicators and etc. It enables a drivers to drive without moving his or her hands off a steering wheel or shifting the driver's view from a moving course. Thereby, drivers can obtain telecommunication information and drive vehicles safely at the same time. The peripheral equipment is made up of an information box and a mount which permit a driver to extend and fold with readiness.

With the technological advances in the telecommunication field, various telecommunication devices are being applied to vehicles recently. In consideration of safety in driving vehicles when drivers using those telecommunication equipment, many prior art peripheral devices (such as a control device) for telecommunication are secured to a steering wheel so that drivers can operate on such devices without moving their hands off steering wheels. It helps drivers effectively in using the advanced devices with security but there are still some following problems developed with such equipment.
1. Common conventional telecommunication devices 9 are secured in an opened space 11 by screws to a steering wheel 11, generally at both sides of a steering wheel 1. This kind of arrangement will cause inconvenience to a driver in grasp of a steering wheel, as shown in FIG. 1.
2. Another arrangement is to secure such a telecommunication device to an upper edge 12 of a steering wheel 1, it will block the visual sight of a driver on the gauges of a dashboard.

The inventor noticed the inconvenience and disadvantages in use of such a prior art telecommunication device on vehicles. He has worked on the problems and come up with a foldable peripheral equipment which can be extended for use and folded in storage so as to increase driving safety in use of such equipment.

SUMMARY OF THE INVENTION

Therefore, the primary object of the present invention is to provide a peripheral equipment for telecommunication which is foldable and attachable to a steering wheel of vehicles. It enables a driver to have easy control on a fee collecting system at a fee collecting station, on a dialing operator of cellular phones, phone incoming indicators and the like in driving without interference with normal operation of a steering wheel and interference with visual sight of a driver on gauges of a dashboard.

To make the present invention more clearly presented, a plurality of drawings are provided with in company with a detailed description of the preferred embodiments of the present invention.

BRIEF DESCRIPTION OF THE DRAWINGS

FIG. 11 is a diagram showing the operation mode of the third embodiment of the present invention;

FIG. 12 is a diagram showing another operation mode of the third embodiment thereof;

DETAILED DESCRIPTION OF THE PREFERRED EMBODIMENTS

Figure 1:
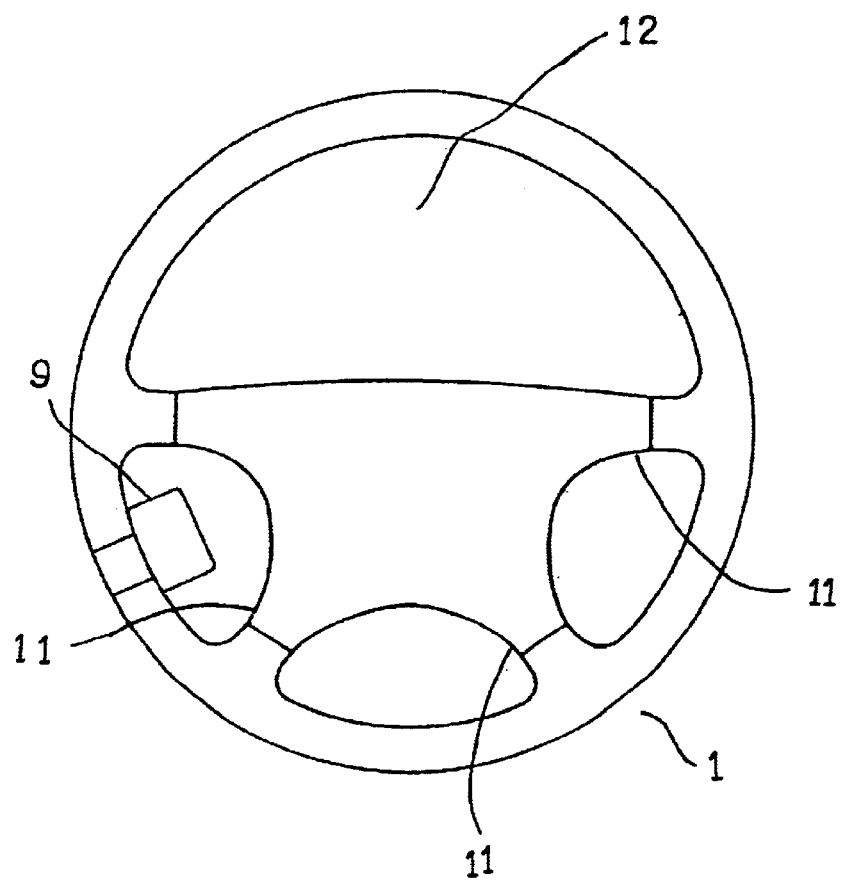
FIG. 1 is a diagram showing a typical steering wheel of a vehicle attached with a prior art peripheral equipment of telecommunication.
Figure 2:
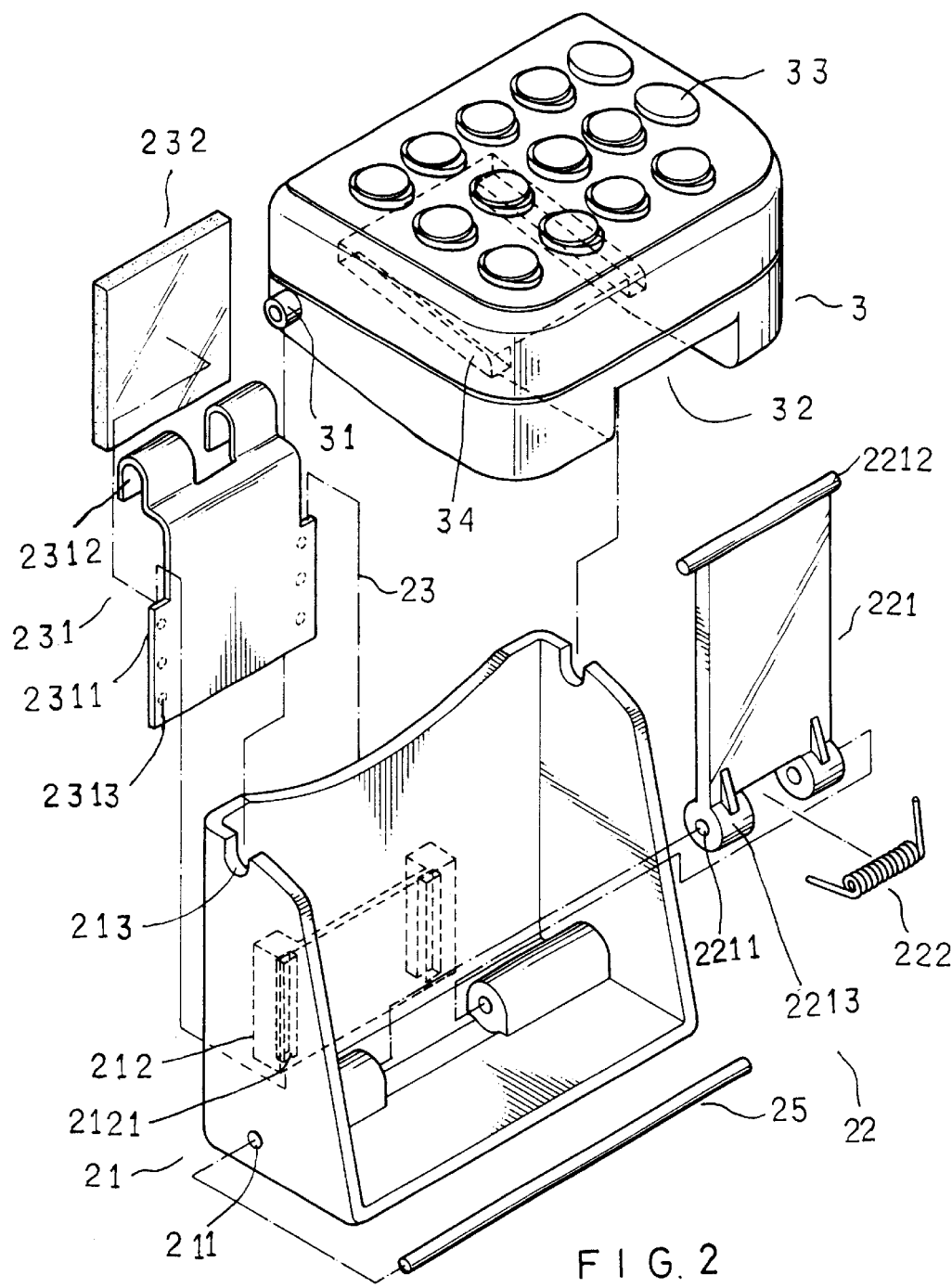
FIG. 2 is a perspective diagram showing the exploded components of the present invention.
Figure 3:
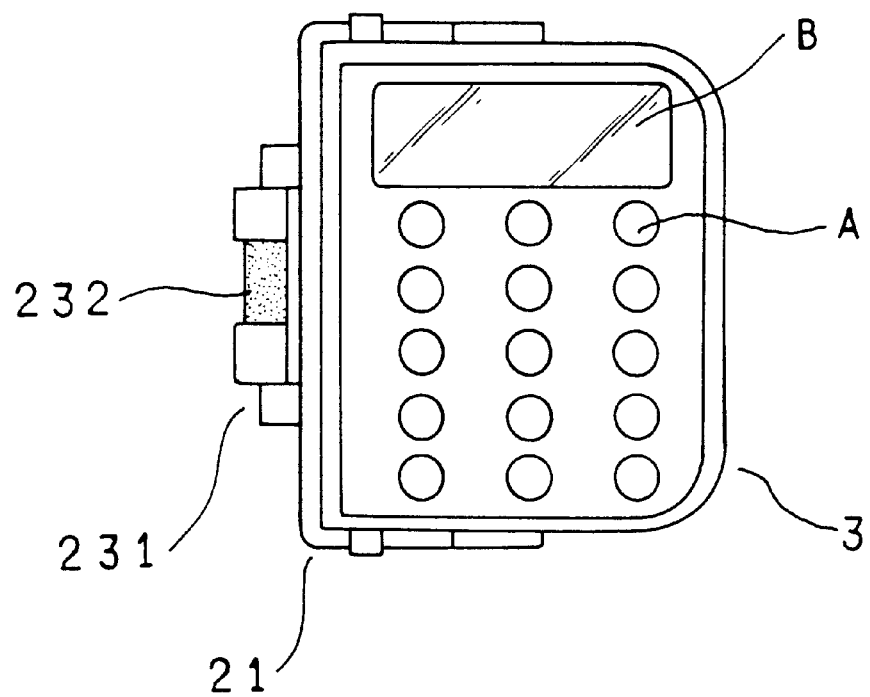
FIG. 3 is a diagram showing the information box of the present invention.
Figure 4:
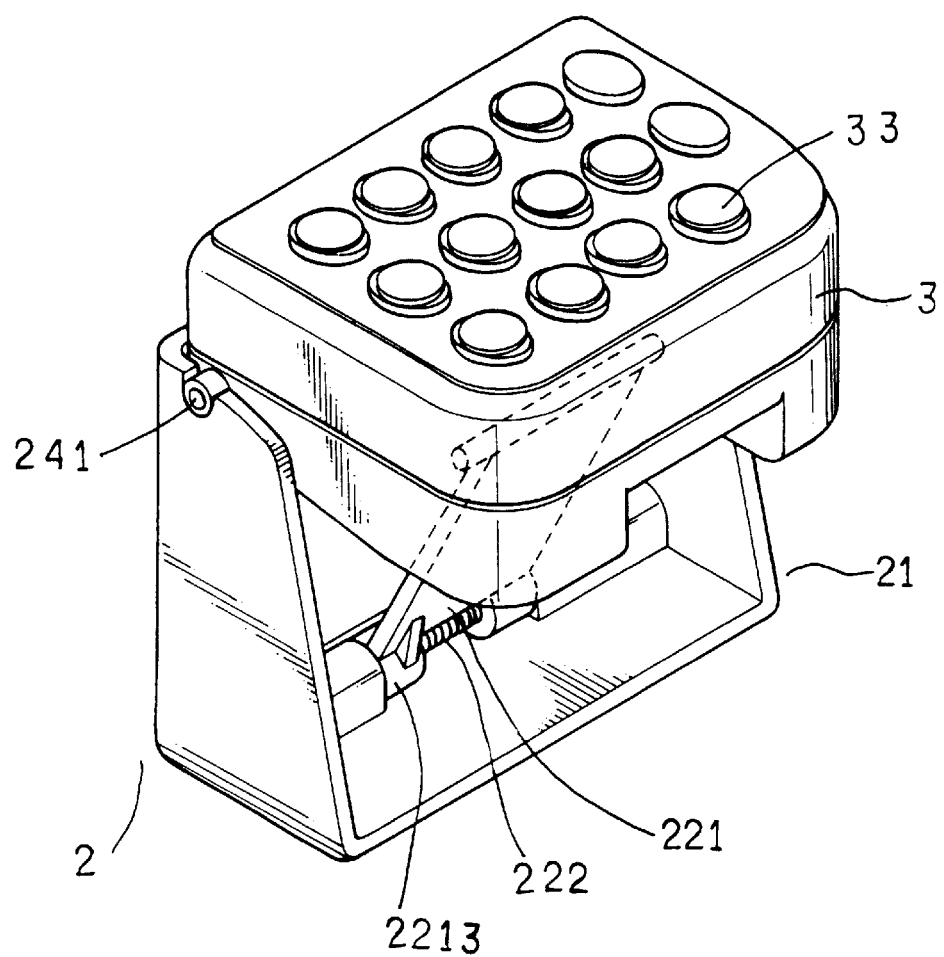
FIG. 4 is a perspective diagram of the present invention.

Referring to FIGS. 2–4, the present invention mainly has an information box 3 housed in or combined with a mount 2. It is characterized in that the mount 2 is equipped with a securing mechanism 23 which enables the mount 2 to be securely combined or engaged with a steering wheel 4 of a vehicle. Thus it permits the information box 3 to be mounted onto somewhere of the steering wheel 4. Besides, a folding mechanism 22 can make the mount 2 foldable in storage or extendable in use.

As described in the proceeding paragraph, the present invention is further made up of the following components in details. The information box 3 is provided with a face board 33 including keys A, liquid crystal display LCD B, sound generator and etc., as shown in FIG. 3. On the underside of such an information box 3 is disposed a receiving cavity 32, which is slightly smaller than the width of a supporting plate 221. On the rear portion of the receiving cavity 32 is defined two parallel sloped tracks 34 for sliding engagement of the ends of an axle 2212 disposed at the top side of the supporting plate 221. On the opposite side of the supporting plate 221 are disposed a pair of spaced cylindrical blocks 2213 each having a through hole 2211. At each rear end of the longitudinal sides of the information box 3 is placed a pivot protrusion 31.

The mount 2 includes a bracket embodiment 21 having a pair of vertical side walls and a vertical rear wall. On a bottom surface of the bracket embodiment 21 and at the rear closed end are disposed a pair of raised blocks each having an axle through hole 211 running therethrough. On the external surface of the vertical rear wall are disposed a pair of protruded blocks 212 each having a vertical groove 2121 for the location of a side wing flange 2311 of a corresponding attachment plate 231. On the top edge of each side wall of the bracket embodiment 21 is disposed a recess 213 for location of the corresponding pivot protrusion 31 of the information box 3. An axle rod 25 is led through the axle through holes 211 of the bracket embodiment 21 and the through holes 2211 of the supporting plate 221 so as to serve as a pivot axle of the supporting plate 221.

A folding mechanism 22 includes the supporting plate 221, a torsion spring 222. An axle 2212 is disposed at the top side of the supporting plate 221 and on the opposite side of the supporting plate 221 are disposed a pair of spaced cylindrical blocks 2213 each having a through hole 2211. The torsion spring 222 is positioned between the spaced cylindrical blocks 2213 when the supporting plate 221 is fixed to the bracket embodiment 21.

The securing mechanism 23 includes the attachment plate 231 and an adhesive piece 232. On the top side of the attachment plate 23 are disposed a pair of spaced hooks 2312 which can be inserted into engagement with a slot 41 of a steering wheel 4. On each longitudinal side of the attachment plate 231 is defined the side wing flange 2311 which is in engagement with each vertical groove 2121 of the two protruded blocks 212 of the bracket embodiment 21. On each side wing flange 2311 are there a plurality of spaced protrusion spots 2313. Both sides of the adhesive piece 232 are coated with glue material so that it can help the supporting plate 221 firmly secured to a steering wheel 4. Alternatively, the bracket embodiment 21 can be simply secured to a proper position of a steering wheel by the adhesive piece 232 which can be a double-sided glue piece or a foamed glue piece.

Figure 5:
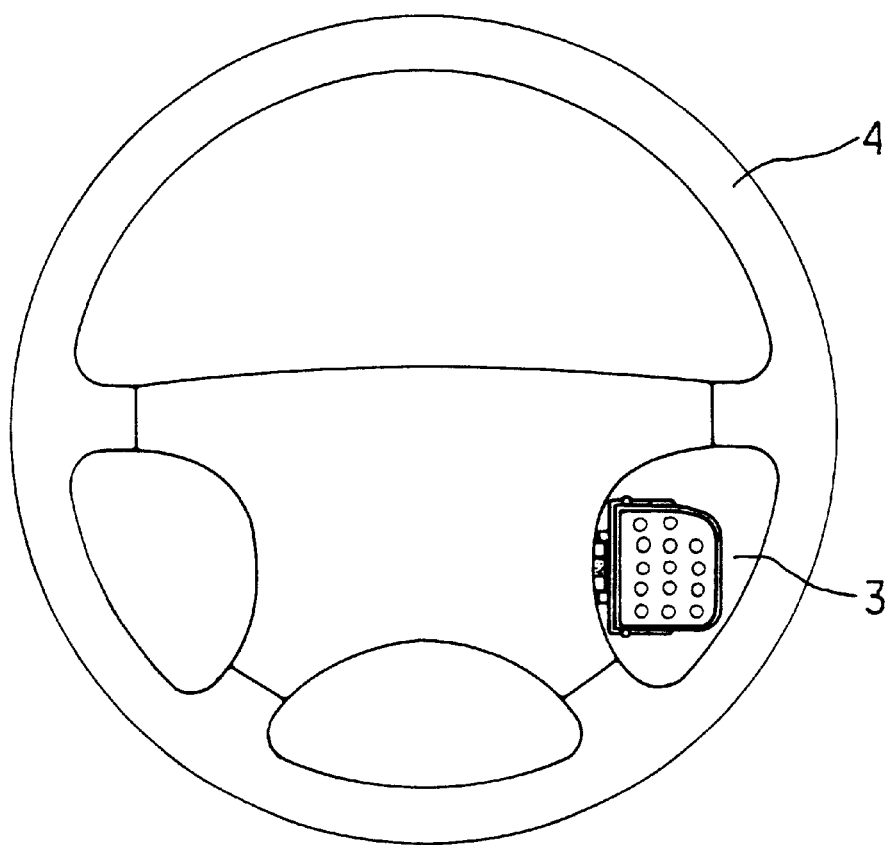
FIG. 5 is a diagram showing the mounting of the present invention to a steering wheel.

As further shown in FIGS. 4, 5, the attachment plate 23 is not only secured to a steering wheel 4 by the hooks 2312 which are engaged with a slot 41 but also further fixed by the adhesive piece 232 fixed between the steering wheel 4 and the attachment plate 231. The slot 41 is preset in the production of a steering wheel 4 or produced by an owner of a vehicle.

Then the axle rod 25 is led through the axle through hole 211 of the bracket embodiment 213, the through holes 2211 of the cylindrical blocks 2213 of the supporting plate 221 and the torsion spring 222 sequentially. In that manner, the supporting plate 221 is normally pushed to lean outwardly, as shown in FIG. 4. The axle 2212 of the supporting plate 221 is engaged with the sloped tracks 34 of the information box 3. In the last step, the bracket embodiment 21 is removably secured to the attachment plate 231 by guiding the bracket embodiment 21 from the top of the attachment plate 231 downwardly, making the side wing flanges 2311 engage with the vertical grooves 2121 of the bracket embodiment 21, as shown in FIG. 5.

Figure 6:
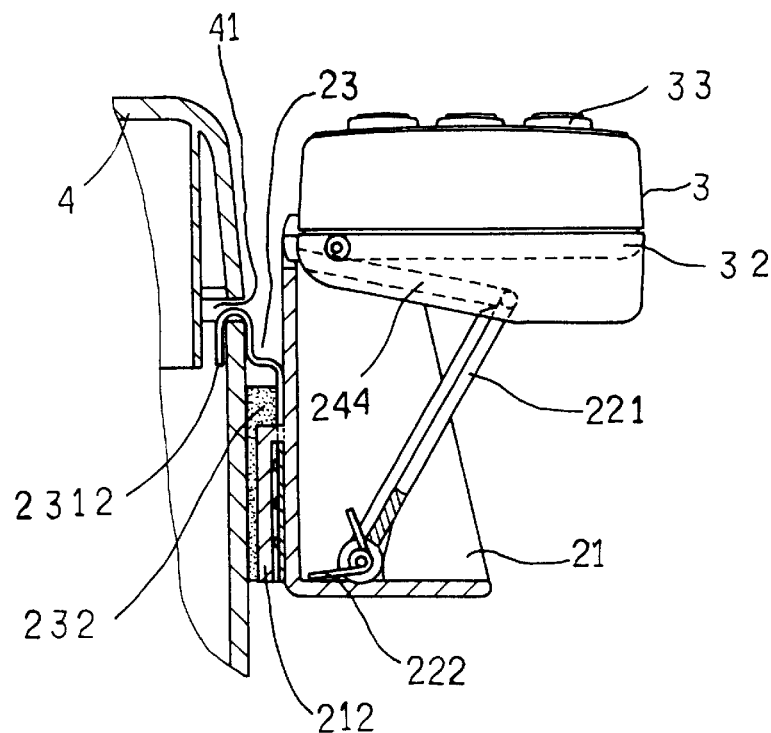
FIG. 6 is a diagram showing the extension mode of the present invention.
Figure 7:
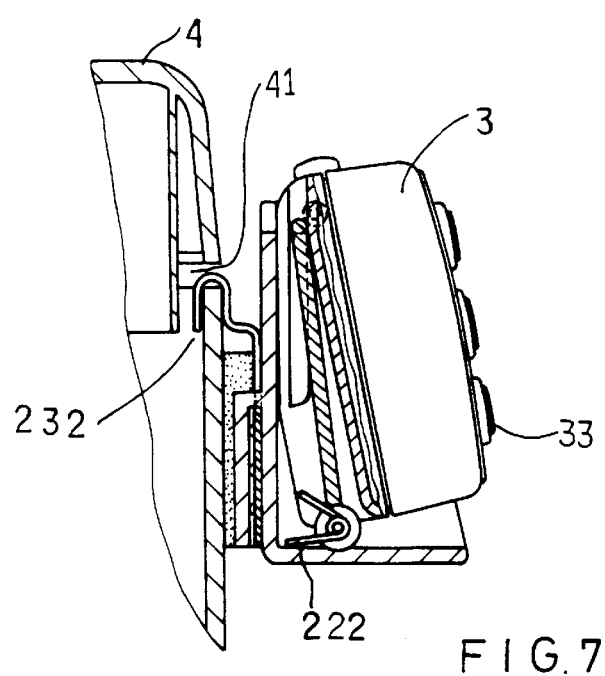
FIG. 7 is a diagram showing the folding mode of the present invention.

Referring to FIGS. 6, 7, as a user is employing a peripheral equipment of telecommunication, the information box 3 is directly pulled upwardly, making the supporting plate 221 pushed by the torsion spring 222 lean at its rightmost position with the axle 2212 moving to the bottom ends of sloped tracks 34. Thereby the supporting plate 221 is put in such a slant position that the information box 3 is held in a horizontal position. So, the face board 33 is exposed to the user for ready usage.

When the information box 3 is folded back into a storage state, the supporting plate 221 is pushed inwardly to cause the information box 3 to fold downwardly. Then, the information box 3 is forced by hand to abut against the bracket embodiment 21, permitting the supporting plate 221 to be snapped into engagement with the receiving cavity 32 of the information box 3 to complete a folding operation.

Figure 8:
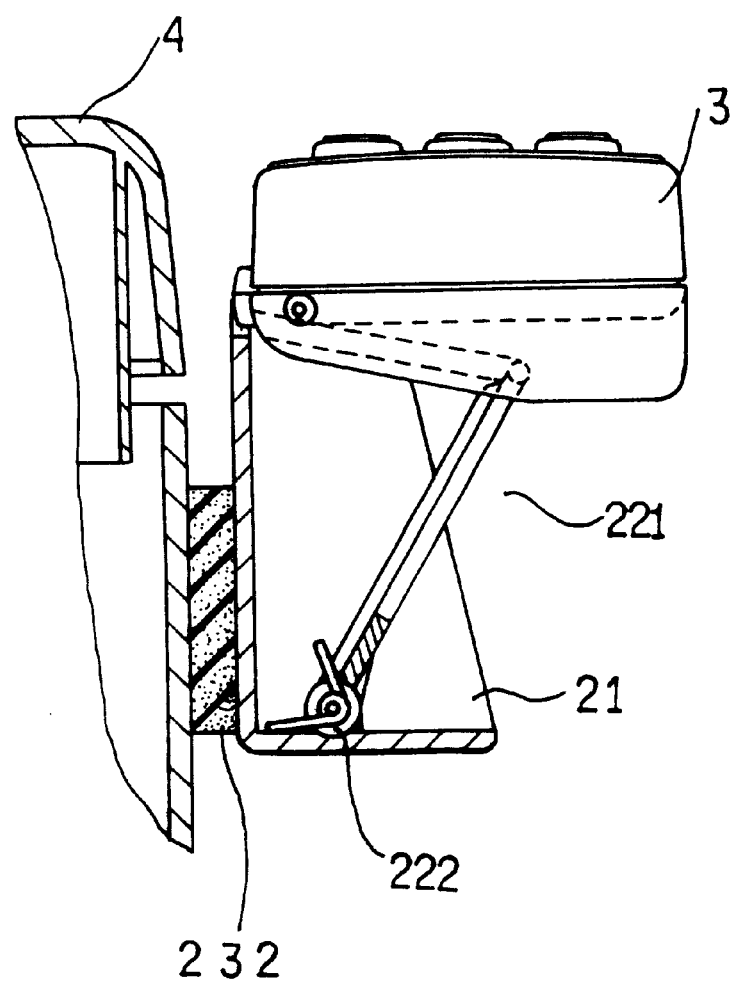
FIG. 8 is a diagram showing a second embodiment of the present invention.

Moreover, for the facility of installation, the securing mechanism 23 can be adapted into a double-sided adhesive piece 232 and the bracket embodiment 21 is no longer provided with protruded blocks 212. The bracket embodiment 21 is directly secured to a proper position of a steering wheel 4, as shown in the second embodiment of the present invention in the FIG. 8.

Figure 9:
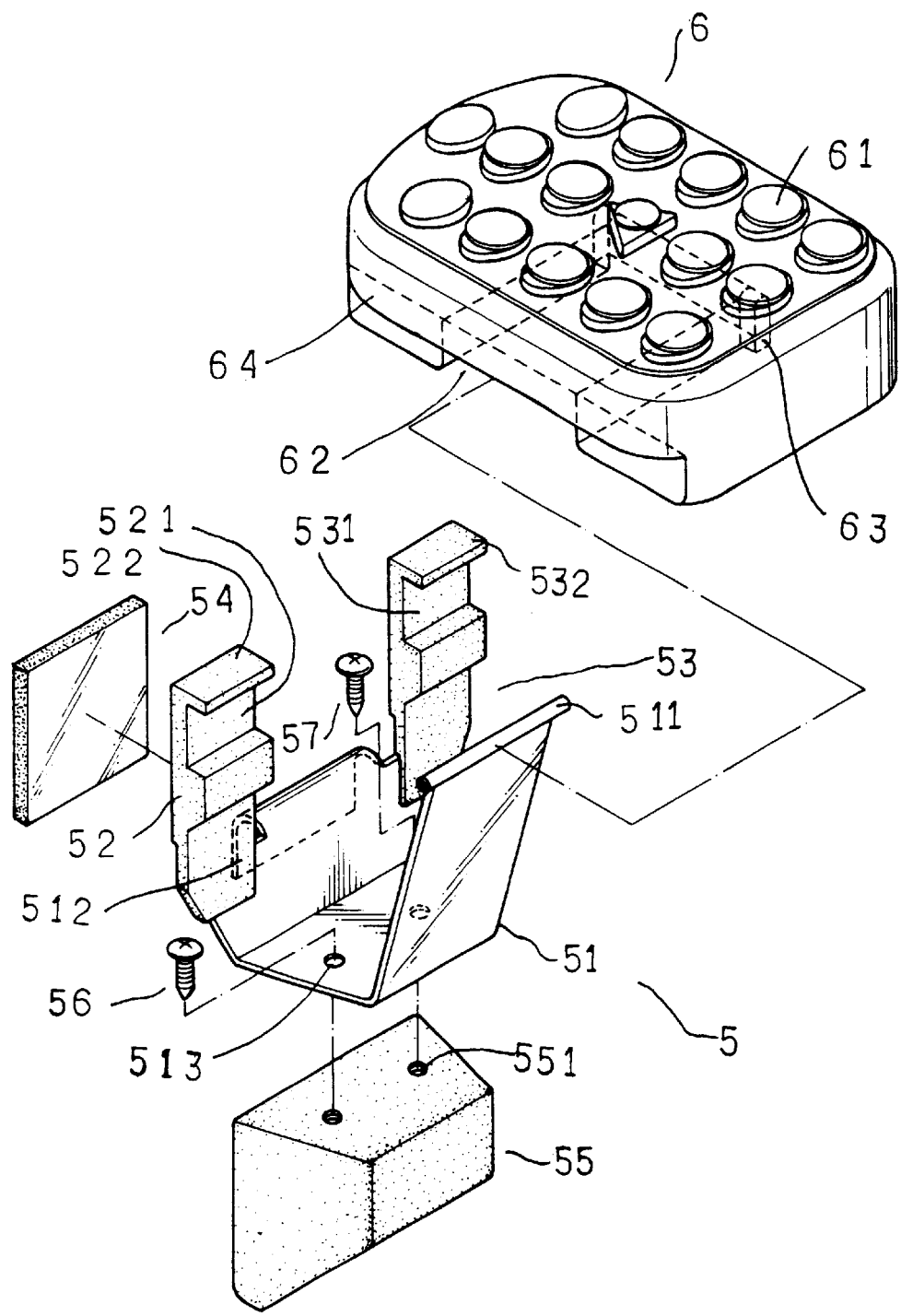
FIG. 9 is a diagram showing a third embodiment of the present invention.
Figure 10:
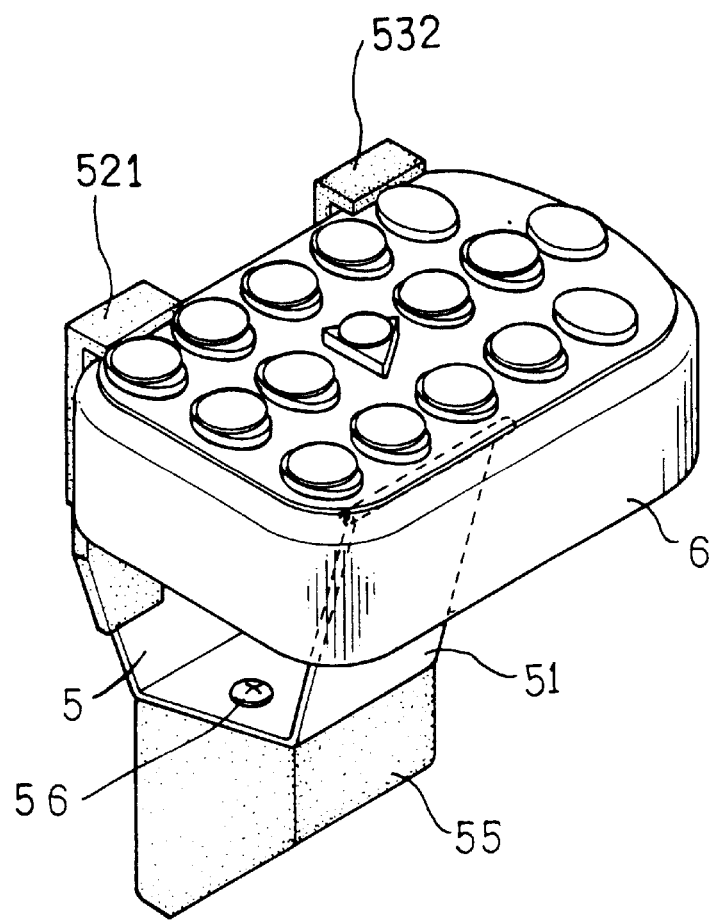
FIG. 10 is a perspective diagram showing the mounting of the third embodiment of the present invention.

Referring to FIG. 9, in the third embodiment of the present invention, it is mainly comprised of an information box 6, a mounting seat 5 and an adhesive piece 54.

The information box 6 is equipped with a data input face board 61 having keys, LCD, sound generator and etc. At the bottom of the information box 61 is disposed a receiving cavity 62 which is slightly larger than the supporting plate 51 of a mounting seat 5. At an inner lateral side of the receiving cavity 62 are disposed a pair of axle cavities 63 and a vertical flange 64 extends downwardly from one longitudinal side of the information box 6.

The mounting seat 5 includes a supporting plate 51 which is approximately U shaped form having a plate portion slant from a vertical position and has an axle 511 at the top edge. There are two hanging members 52, 53 each having a retaining recess 521, 531 respectively for snap engagement with the vertical flange 64 of the information box 6. The respective top end of the hanging members 52, 53 is provided with a hook extension 522, 532. The supporting plate 51 is provided with a hook element 512 at an opposite edge of the axle 511. A base block 55 having a pair of screw holes 551 in correspondence to holes 513 of the supporting plate 51 is fixed by screws 56 to the bottom of the supporting plate 51.

An adhesive piece 54 is coated with glue on both sides to reinforce the attachment of the supporting plate 51 to a steering wheel. The adhesive piece 54 can be a double-sided glue tape, a foamed glue piece and the like.

By way of the previously described assembly, the hook element 512 of the supporting plate 51 is engaged with a crevice 71 of the steering wheel 7 so that the supporting plate 51 can be firmly secured with the help of the adhesive piece 54. In the last step, the axle 511 of the supporting plate 51 is engaged with the axle cavities 63 of the information box 6 so as to permit the information box 6 to be pivoted about the axle 511 supported by the axle cavities 63.

As a user is going to use the information box 6 of the present invention, the information box 6 is pried upwardly to make the vertical flange 64 come into engagement with the retaining recesses 521, 531 of the hanging members 52, 53. At then the supporting plate 51 is pushed outwardly, causing the supporting plate to produce a reaction force, which will support the information box 6 in position. To get the information box 6 folded, the information box 6 is pulled outwardly and then pressed downwardly so that the supporting plate 51 is fully housed in the receiving cavity 62 of the information box 6. Afterwards, the information box 6 is pushed along with the supporting plate 51 inwardly toward the steering wheel 7 so as to make the hook extensions 522, 532 of the hanging members 52, 53 hold the information box 6 in place.

Figure 13:
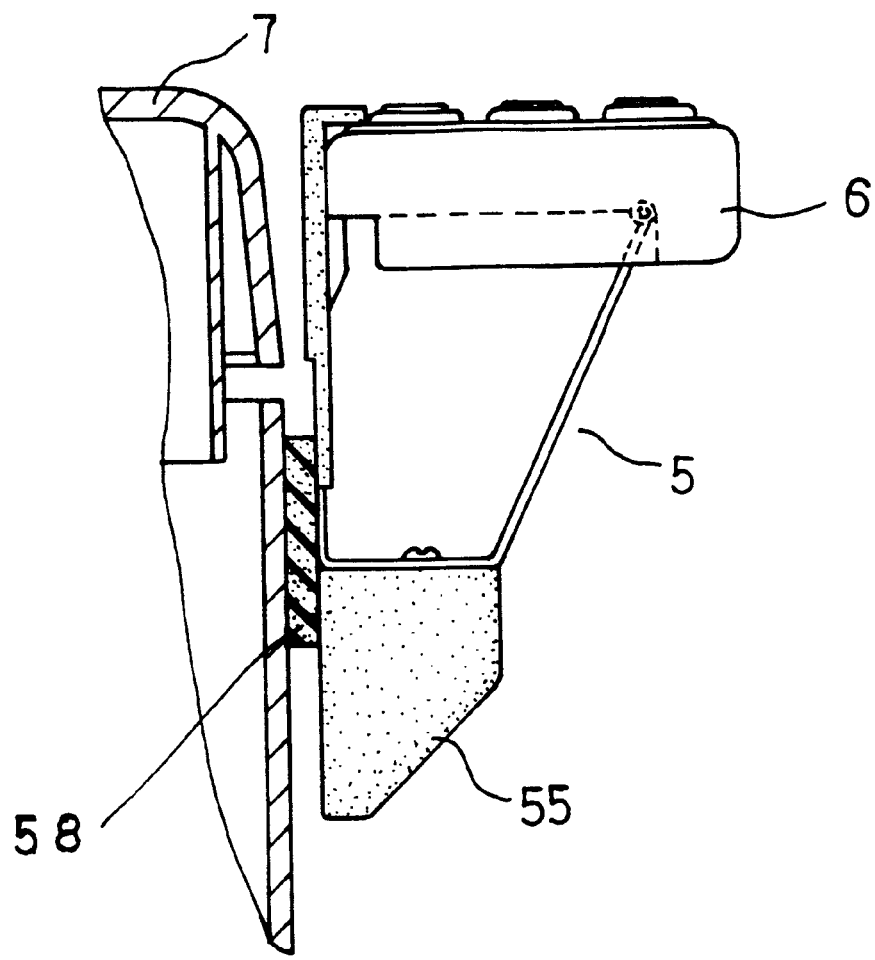
FIG. 13 is a diagram showing the fourth embodiment of the present invention.

Referring to FIG. 13, a fourth embodiment of the present invention is designed in consideration of facility of production. The hook element disposed at the rear edge of the supporting plate 51 is removed and an adhesive piece 58 is used to secure the mounting seat 5 to a proper position of the steering wheel 7.

In summary, the present invention is simple in structure and ready for use without interference of the normal operation of a steering wheel and a driver's visual sight of gauges of vehicles.

I claim:

1. A foldable peripheral equipment for telecommunication use attached to a steering wheel of a vehicle, comprising an information box pivotally coupled to a mount, said mount including an adhesive coupling element for mounting to a selected position of a steering wheel, said information box being pivotally displaceable in a first direction relative to said mount for use and displaceable in a second opposing direction relative to said mount to a folded position for storage;

wherein said mount includes a bracket and a supporting plate having a first end pivotally coupled to said bracket, said supporting plate having a second end slidably coupled to said information box.

2. The foldable peripheral equipment for telecommunication use as claimed in claim 1, wherein said information box has an input face board including at least keys, an LCD, and a sound generator; said information box having a receiving cavity at a bottom of said information box, which is slightly smaller than a lateral width of said supporting plate; a rear portion of said receiving cavity being formed with a pair of parallel sloped tracks with which an axle defined at a top edge of said supporting plate is engaged so as to permit said supporting plate to be movable in said receiving cavity for a folding or an extending operation; a pivot protrusion being disposed at each longitudinal side of said information box so as to permit said information box to be pivotally mounted to said bracket by respectively engaging said pivot protrusions within two recesses formed in vertical side walls of said bracket.

3. A foldable peripheral equipment for telecommunication use attached to a steering wheel of a vehicle, comprising an information box pivotally coupled to a mount, said mount including an adhesive coupling element for mounting to a selected position of a steering wheel, said information box being pivotally displaceable in a first direction relative to said mount for use and displaceable in a second opposing direction relative to said mount to a folded position for storage;

wherein said mount comprises:
an approximately U-shaped supporting plate having a hook element at one rear end;
two hanging members symmetrically attached to a side of said rear end of said supporting plate with said hook element sandwiched therebetween;
each said hanging member having a retaining recess defined in conformance to a vertical flange of said information box; and above each retaining recess being disposed a hook extension;
said adhesive coupling element being coated with glue on two opposing sides thereof and being disposed adjacent to said hook element at said rear end of said supporting plate for attachment of supporting plate to a steering wheel.

4. A foldable peripheral equipment for telecommunication use attached to a steering wheel of a vehicle, comprising an information box pivotally coupled to a mount, said mount including an adhesive coupling element for mounting to a selected position of a steering wheel, said information box being pivotally displaceable in a first direction relative to said mount for use and displaceable in a second opposing direction relative to said mount to a folded position for storage;

wherein said mount comprises:
a bracket having two vertical side walls and a rear wall and two axle through holes disposed thereon; a pair of protruded blocks disposed on an outer surface of said vertical rear wall; each said protruded block having a vertical groove for retaining of a side of said attachment plate; on a top edge of each said vertical side wall a recess is disposed for supporting a pivot protrusion disposed on each side of said information box; between said two vertical side walls and at a foot of said vertical rear wall is disposed a pair of spaced cylindrical blocks and each said axle through hole is defined therein; and an axle rod is led through said two axle through holes to pivotally retain said supporting plate in place so that said supporting plate can be pivoted around said axle rod;
a folding mechanism including said supporting plate and a torsion spring;
said supporting plate having an axle integrally disposed at an upper edge thereof; said axle being slightly longer than an upper edge of said supporting plate; said torsion spring being disposed between a pair of cylindrical blocks of said supporting plate and retained in place by said axle rod so as to permit said supporting plate to be retractably operated;
a securing mechanism including an attachment plate and an adhesive piece; hook means being disposed at a top edge of said attachment plate for fixing said attachment plate to a steering wheel of a vehicle; at each longitudinal edge of said attachment plate being disposed a side wing flange on which are disposed a plurality of spaced protrusions so as to permit said side wing flanges to be firmly engaged with a pair of two parallel vertical grooves defined on an external surface of said bracket embodiment; said adhesive piece having two sides thereof coated with glue material so as to permit said adhesive piece to be alternatively secured to said attachment plate on one side and to a steering wheel on the other side; or said adhesive piece being fixed to said rear wall of said bracket embodiment for attachment of said bracket embodiment to a steering wheel.

5. A foldable peripheral equipment for telecommunication use, comprising:
an information box in combination with a mount;
said mount including a bracket having two vertical side walls and a rear wall and two axle through holes disposed thereon;
a pair of protruded blocks disposed on an outer surface of said rear wall; each said protruded block having a vertical groove for retaining a side of an attachment plate therein;
on a top edge of each said vertical side wall a recess is disposed for supporting a pivot protrusion disposed on each side of said information box so as to permit said information box to be pivotally mounted thereto;
between said two vertical side walls and at a foot of said vertical rear wall being disposed a pair of spaced cylindrical blocks and each said axle through-hole being defined therein; and
an axle rod is led through said two axle through-holes to pivotally retain a supporting plate in place so that said supporting plate can be pivoted around said axle rod;
a folding mechanism including said supporting plate and a torsion spring;
said supporting plate having an axle integrally disposed at an upper edge thereof;
said axle being slightly longer than an upper edge of said supporting plate; said torsion spring being disposed between a pair of cylindrical blocks of said supporting plate and retained in place by said axle rod so as to permit said supporting plate to be retractably operated;
a securing mechanism including said attachment plate and an adhesive piece;

a hook means being disposed at a top edge of said attachment plate for fixing said attachment plate to a steering wheel of a vehicle;

at each longitudinal edge of said attachment plate being disposed a side wing flange on which are disposed a plurality of spaced protrusions so as to permit said side wing flanges to be firmly engaged with a pair of two parallel vertical grooves defined on an external surface of said bracket embodiment; said adhesive piece having two sides thereof coated with glue material so as to permit said adhesive piece to be secured to said attachment plate on one side thereof and to a steering wheel on the other side of said adhesive piece;

said information box having an input face board including at least keys, an LCD, and a sound generator;

said information box having a receiving cavity at a bottom of said information box, which is slightly smaller than a lateral width of said supporting plate;

at a rear portion of said receiving cavity being defined a pair of parallel sloped tracks with which an axle defined at a top edge of said supporting plate is engaged so as to permit said supporting plate to be movable in said receiving cavity in a folding or an extending operation;

a pivot protrusion being disposed at each longitudinal side of said information box so as to permit said information box to be pivotally mounted to said bracket by engaging said pivot protrusions with said two recesses on vertical side walls of said bracket.

6. A foldable peripheral equipment for telecommunication use, comprising:

an information box in combination with a mount;

said mount including a bracket having two vertical side walls and a rear wall and two axle through holes disposed thereon;

a pair of protruded blocks disposed on an outer surface of said rear wall; each said protruded block having a vertical groove for retaining a side of an attachment plate therein;

on a top edge of each said vertical side wall a recess is disposed for supporting a pivot protrusion disposed on each side of said information box so as to permit said information box to be pivotally mounted thereto;

between said two vertical side walls and at a foot of said vertical rear wall being disposed a pair of spaced cylindrical blocks and each said axle through-hole being defined therein; and an axle rod is led through said two axle through-holes to pivotally retain a supporting plate in place so that said supporting plate can be pivoted around said axle rod;

a folding mechanism including said supporting plate and a torsion spring;

said supporting plate having an axle integrally disposed at an upper edge thereof;

said axle being slightly longer than an upper edge of said supporting plate; said torsion spring being disposed between a pair of cylindrical blocks of said supporting plate and retained in place by said axle rod so as to permit said supporting plate to be retractably operated;

an adhesive piece having two sides thereof coated with a glue material, said adhesive piece being secured to said rear wall of said bracket on one side thereof and to a steering wheel on the other side of said adhesive piece;

said information box having an input face board including at least keys, an LCD, and a sound generator;

said information box having a receiving cavity at a bottom of said information box, which is slightly smaller than a lateral width of said supporting plate;

at a rear portion of said receiving cavity being defined a pair of parallel sloped tracks with which an axle defined at a top edge of said supporting plate is engaged so as to permit said supporting plate to be movable in said receiving cavity for a folding or an extending operation;

a pivot protrusion being disposed at each longitudinal side of said information box so as to permit said information box to be pivotally mounted to said bracket by engaging said pivot protrusions with said two recesses on vertical side walls of said bracket.

* * * * *